United States Patent Office 3,471,481
Patented Oct. 7, 1969

3,471,481
BENZOTHIAZINES
John Krapcho, Somerset, N.J., assignor to E. R. Squibb & Sons, Inc., New York, N.Y., a corporation of Delaware
No Drawing. Filed Mar. 28, 1966, Ser. No. 537,709
Int. Cl. C07d 93/14; A61k 27/00
U.S. Cl. 260—240          8 Claims This invention relates to new chemical compounds having valuable therapeutic properties and processes for the preparation thereof.

The therapeutically active compounds of this invention are bases of the general Formula I:

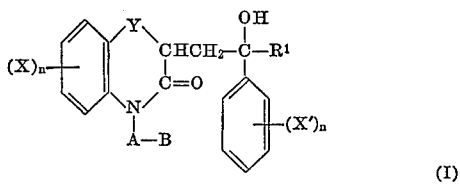

their dehydration and reduction products, acid-addition salts and quaternary salts thereof, wherein Y is selected from the group consisting of thia (—S—), sulfone (—$SO_2$—) and sulfoxide (—SO—); X and X' are selected from the group consisting of hydroxy, lower alkyl, lower alkoxy, aryloxy, alkylthio nitro, amino, halo and trifluoromethyl; $R^1$ is selected from the group consisting of hydrogen; lower alkyl, aralkyl, thienyl, pyridyl, cycloalkyl (e.g., cyclohexyl) and X-substituted mononuclear aryl; n is 0 to 5; A is lower alkylene (preferably ethylene and propylene); and B is a basic nitrogen-containing radical of less than twelve carbon atoms. Among the suitable radicals represented by the symbol B are: amino; (lower alkyl)amino; di(lower alkyl)amino; (hydroxy-lower alkyl)amino; di(hydroxy-lower alkyl)amino; phenyl(lower alkyl)amino; N-(lower alkyl)phenyl (lower alkyl)amino; and saturated 5- to 7-membered monocyclic heterocyclic radicals of less than twelve carbon atoms, as exemplified by piperidino; (lower alkyl)piperidino; di(lower alkyl)piperidino; (lower alkoxy)piperidino; homopiperidino; 2,3- or 4-piperidyl; 2,3- or 4-(N-lower alkyl piperidyl): pyrrolidino; (lower alkyl) pyrrolidino; di(lower alkyl)pyrrolidino; (lower alkoxy) pyrrolidino; 2- or 3-pyrrolidyl; 2- or 3-(N-lower alkyl pyrrolidyl); morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazino; 4-$R^1$-substituted piperazino (e.g., $N^4$-ethylpiperazino); [hydroxy-(lower alkyl)]piperazino [e.g., $N^4$-(2-hydroxyethyl) piperazino]; (lower alkyl)piperazino (e.g., $N^4$-methylpiperazino); di(lower alkyl)piperazino; (lower alkoxy) piperazino; homopiperazino; and 4-$R^1$-substituted homopiperazino (e.g., $N^4$-benzylhomopiperazino).

The terms "lower alkyl," "lower alkoxy," and "lower alkylene," as employed herein, include both straight and branched chain radicals of from one to eight carbon atoms. The term "aryl" as employed herein includes radicals such as X-substituted phenyl (including 3,4-methylenedioxyphenyl and 3,4-ethylenedioxyphenyl).

The particularly preferred compounds are those wherein X and X' are hydrogen or chloro; $R^1$ is hydrogen; A is ethylene or propylene and B is di(lower alkyl)amino.

As to the salts, those coming within the purview of this invention include the non-toxic acid-addition salts and the quaternary ammonium salts. Acids useful for preparing these acid-addition salts include, inter alia, inorganic acids, such as the hydrohalic acids (e.g., hydrochloric and hydrobromic acid), sulfuric acid, nitric acid, and phosphoric acid, and organic acids such as maleic, tartaric citric, acetic, salicyclic, succinic, theophylline 9-chlorotheophylline, maleic, benzoic, nicotinic, methanesulfonic or cyclohexanesulfamic. The quaternary ammonium salts include those formed with lower alkyl halides (e.g., methyl bromide, ethyl chloride and propyl iodide), benzyl halides (e.g., benzyl chloride) and di-lower alkyl sulfates (e.g., dimethyl sulfate).

Compounds of this invention and the salts thereof possess central nervous system modifying activity, particularly as depressants and are therefore useful as tranquilizers. They may be administered orally or parenterally in the form of tablets, capsules, elixirs, injectables, or the like, by incorporating the appropriate dosage of the compound of Formula I, the dehydration or reduction products thereof, or a physiologically acceptable salt thereof in a dosage range similar to that used with chlordiazepoxide.

The compounds of this invention can be prepared by condensing a compound of the formula

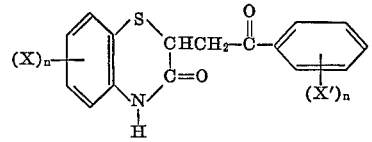

wherein X, X' and n are as hereinbefore defined, with an aminoalkyl halide of the formula B—A—Hal, wherein B and A are as hereinbefore defined and Hal is halide, preferably chlorine or bromine to yield a compound of the formula

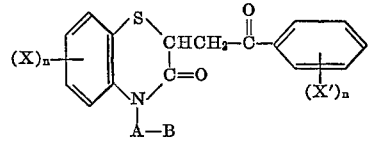

wherein A and B are as defined above. In some cases it is preferred to react Compound II with a reagent having the formula Hal—A—Hal, wherein Hal and A are as hereinbefore defined, to form an intermediate which is then reacted with a reagent having the formula HB to yield a compound of Formula III. Examples of compounds having the formula Hal—A—Hal are 1,3-dibromo propane and 1-bromo-2-chloroethane. Compounds having the formula HB are 4-($\beta$-hydroxy ethyl)piperazine and diethanolamine.

This reaction is preferably conducted by heating the reactants in the presence of a basic condensing agent, such as an alkali metal, an alkali metal amide (e.g., sodamide), or an alkali metal hydroxide.

Reduction of compounds of Formula III with sodium borohydride yields the products of Formula I wherein $R^1$ is hydrogen. Further compounds of Formula III may be reacted with a reagent having the formula $R^1$—Mg—Hal or $R^1$—Li, wherein $R^1$ and Hal are as defined above to yield compounds of Formula I having the variables of $R^1$. Examples of reagents that may be utilized in the practice of the invention are methylmagnesium chloride, thienylmagnesium chloride, cyclohexylmagnesium bromide, p-chlorophenylmagnesium bromide, m-methoxyphenylmagnesium chloride, m-trifluorophenyl lithium, 2-pyridyl lithium, and so forth.

The compounds of Formula I may be treated with oxalic, sulfuric or hydrochloric acids to prepare the dehydration products of the invention. It is also possible to reduce the products of Formula I by treatment with a reducing agent such as hydroiodic acid-phosphorus reagent and thereby convert the hydroxyl group to hydrogen.

To prepare the starting materials (the compounds of Formula II) a 2-aminothiophenol of the formula

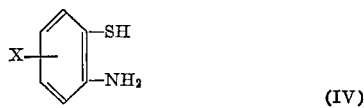

wherein X is as hereinbefore defined, is interacted with an acrylic acid derivative of the formula

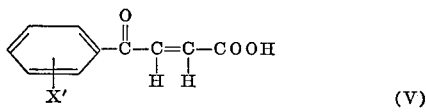

Suitable reactants IV include 2-aminobenzenethiol; 2-amino(lower alkyl)benzenethiols, (e.g., 2-amino-4-methylbenzenethiol, 2-amino-3-ethylbenzenethiol, 2-amino-4-n-propylbenzenethiol, 2-amino-4-isopropylbenzenethiol, 2-amino-3-butylbenzenethiol, and 2-amino-4-hexylbenzenethiol); 2-amino-loweralkoxybenzenethiols, (such as 2-amino-4-methoxybenzenethiol, 2-amino-3-ethoxybenzenethiols, 2-amino-5-n-propoxybenzenethiol, and 2-amino-4-pentoxybenzenethiol); 2-aminonitrobenzenethiols (e.g., 2-amino-4-nitrobenzenethiol); 2-amino-halo-benzenethiols, (such as 2-amino-4-chlorobenzenethiol, 2-amino-4-bromobenzenethiol and 2-amino-3-fluorobenzenethiol); 2-aminotrifluoromethylbenzenethiols, such as 2-amino-4-trifluoromethylbenzenethiol; 2-amino-aryloxybenzenethiols, such as 2-amino-4-phenoxybenzenethiol; and 2-amino-alkylthiobenzenethiols, (such as 2-amino-3-ethylthiobenzenethiol and 2-amino-4-pentylthiobenzenethiol).

Suitable reactants V include benzoyl acrylic acids, such as 3-methylbenzoyl-; 4-heptylbenzoyl-; 4-isopropylbenzoyl-; 3-methoxybenzoyl-; 4-isobutoxybenzoyl-; 4-heptoxybenzoyl-; 4-phenoxybenzoyl-; 4-methylthiobenzoyl-; 5-pentylthiobenzoyl-; 3-aminobenzoyl-; 4-nitrobenzoyl-; 4-chlorobenzoyl-; 3-chloro-4-methylbenzoyl-; 3,4-dichlorobenzoyl-; 3,4,5-trimethoxybenzoyl-; 3-trifluoromethylbenzoyl acrylic acids, and so forth.

Compound I wherein X is hydroxy may be formed by reacting a compound wherein X is alkoxy with concentrated hydrochloric acid or with pyridine hydrochloride. Final product I may be converted to its corresponding sulfone and sulfoxide derivatives by oxidation. Compound I may be reacted with potassium permanganate to yield the sulfoxides while if it is reacted with hydrogen peroxide, the sulfones will be produced.

The following examples illustrate the invention, all temperatures are in degrees centigrade unless otherwise stated:

EXAMPLE 1

4-(2-dimethylaminoethyl)-2-($\beta$-hydroxyphenethyl)-2H-1,4-benzothiazin-3(4H)-one, hydrochloride, dihydrate (A) Preparation of 2-phenacyl-2H-1,4-benzothiazin-3-(4H)-one.—A mixture of 35.2 g. of benzoylacrylic acid, 200 ml. of toluene and 15 ml. of dimethylformamide is stirred and treated with a solution of 25 g. of 2-aminobenzenethiol. The temperature rises to 40° and a crystalline solid separates. The mixture is then refluxed for four hours, cooled and the colorless product is filtered and dried; wt. 48.0 g., M.P. 173–175°.

(B) Preparation of 4-(2-dimethylaminoethyl)-2-phenacyl-2H-1,4-benzothiazin-3(4H)one.—A suspension of 42.5 g. of material from part (A), 6.0 g. of sodamide and 900 ml. of toluene is stirred and heated at 100° for thirty minutes. The resulting gelatinous slurry is cooled to 35°, treated with a solution of 19.3 g. of 2-dimethylaminoethyl chloride in 62 ml. of toluene and the mixture refluxed for three hours. After cooling to room temperature, the mixture is treated with 250 ml. of water, filtered the small amount of starting material and the organic phase of the filtrate is then extracted with a solution of 25 ml. of concentrated hydrochloric acid in 300 ml. of water. The aqueous phase is cooled and treated with a solution of 18 g. of sodium hydroxide in 50 ml. of water. The liberated base is extracted with 500 ml. of ether (three portions), the ether layers are combined, dried over magnesium sulfate, treated with Darco and filtered. The filtrate is concentrated under reduced pressure to give 45 g. of a semi-solid. The latter material is triturated with 750 ml. of hot hexane and the hexane solution decanted from the insoluble gummy material. Cooling the hexane solution gives 26.0 g. of pale yellow solid, M.P. 80–83°. After crystallization from 50 ml. benzene-50 ml. of hexane, the nearly colorless solid weighs 21.5 g., M.P. 83–85°.

The hydrochloride salt of this material after recrystallization from acetonitrile, melts at 163–165°.

(C) Preparation of 4-(2-dimethylaminoethyl)-2-($\beta$-hydroxyphenethyl) - 2H - 1,4-benzothiazin-3(4H)-one, hydrochloride dihydrate.—A solution of 7.0 g. of material from part (B) is stirred at room temperature and treated portionwise with 2 g. of sodium borohydride. The resulting mixture is then stirred for two hours, the solvent removed under reduced pressure, and the residue treated with 50 ml. of water and 100 ml. of ether. The layers are separated and the aqueous phase again extracted with ether.

The ether phases are combined, dried over magnesium sulfate, filtered and the filtrate concentrated under reduced pressure to give 7.0 g. of semi-solid residue. This material is dissolved in 600 ml. of ether and the solution treated with an equivalent quantity of hydrogen chloride in ether to give 7.3 g. of the hydrochloride salt. This material is dissolved in 50 ml. of chloroform, treated with Darco and filtered. Dilution of the filtrate to 400 ml. of ether gives 7.1 g. of hygroscopic material, M.P. about 95–100°. This material analyzes satisfactorily for a dihydrate.

EXAMPLE 2

4-[3-(4-methyl-1-piperazinyl)propyl]-2-($\beta$-hydroxyphenethyl)-2H-1,4-benzothiazin-3(4H)-one (A) Preparation of 4-[3-(4-methyl-1-piperazinyl)propyl]-2-phenacyl-2H-1,4-benzothiazin-3(4H)-one.—A suspension of 85.0 g. of material from part A of Example 1 is reacted with 12.0 g. of sodamide and 60.0 g. of 1-(3-chloropropyl)-4-methylpiperazine in 1.5 l. of toluene in the manner described in part B of Example 1 to give 67.4 g. of product, M.P. 91–96°. Recrystallization of this material from 70 ml. of acetonitrile gives 54.0 g. of pale yellow product, M.P. 119–121°.

(B) Preparation of 4 - [3 - (4-methyl-1-piperazinyl)propyl]-2-($\beta$-hydroxyphenethyl)-2H-1,4-benzothiazin - 3(4H)-one.—A suspension of 17.0 g. of material from part (A) is stirred and treated portionwise with 4.0 g. of sodium borohydride while the temperature is maintained at 20–40°. The resulting solution is stirred for two hours at room temperature, the solvent removed under reduced pressure and the residue treated with 50 ml. of water and 100 ml. of ether. The layers are separated and the aqueous phase is again extracted with ether. The ether phases are combined, dried over magnesium sulfate, filtered and the filtrate concentrated under reduced pressure to give 17.0 g. of colorless solid.

EXAMPLE 3

4-[3-(4-methyl-1-piperazinyl)propyl]-2-styryl-2H-1,4-benzothiazin-3(4H)-one, dihydrochloride A solution of 17 g. of the material from Example 2 in 100 ml. of concentrated hydrochloric acid and 200 ml. of acetic acid is refluxed for three hours. The solution is concentrated under reduced pressure, the residue is triturated with 200 ml. of ether and then digested with 50 ml. of hot acetonitrile. This mixture is cooled, diluted with 200 ml. of ether to give 18.6 g. of nearly colorless product, M.P. 225–230°. After crystallization from 700 ml. of ethanol, the colorless solid melts at 243–246°.

EXAMPLE 4

4-(2-diethylaminoethyl)-2-(β-hydroxyphenethyl)-2H-1,4-benzothiazin-3(4H)-one Following the procedure of Example 1 but substituting an equivalent amount of 2-diethylaminoethyl bromide for the 2-dimethylaminoethyl chloride, the above-named product is recovered.

EXAMPLE 5

4-(2-pyrrolidinylethyl)-2-(β-hydroxyphenethyl)-2H-1,4-benzothiazin-3(4H)-one Following the procedure of Example 1 but substituting an equivalent amount of 2-(1-pyrrolidinyl)ethyl chloride for the 2-dimethylaminoethyl chloride, the above-named product is recovered.

EXAMPLE 6

4-(3-dimethylaminopropyl)-2-(β-hydroxyphenethyl)-2H-1,4-benzothiazin-3(4H)-one Following the procedure of Example 1 but substituting an equivalent amount of 3-dimethylaminopropyl chloride for the 2-dimethylaminoethyl chloride, the above-named product is recovered.

EXAMPLE 7

4-[2(N-methyl-N-phenethylamino)ethyl]-2-(β-hydroxyphenethyl)-2H-1,4-benzothiazin-3(4H)-one Following the procedure of Example 1 but substituting an equivalent amount of 2-(N-methyl-N-phenethylamino) ethyl chloride for the 2-dimethylaminoethyl chloride, the above-named product is recovered.

EXAMPLE 8

4-(2-dimethylaminoethyl)-2-(β-hydroxy-m-ethylphenethyl)-2H-1,4-benzothiazin-3(4H)-one hydrochloride Following the procedure of Examples 1(A), 1(B) and 1(C) but substituting an equivalent amount of 2-amino-m-ethylbenzoylacrylic acid in lieu of benzoylacrylic acid, the above-named product is formed.

EXAMPLE 9

4-(2-dimethylaminoethyl)-2-(β-hydroxy-p-methylphenethyl)-2H-1,4-benzothiazin-3-(4H)-one, hydrochloride Following the procedure of Examples 1(A), 1(B), and 1(C) but substituting an equivalent amount of p-methoxybenzoylacrylic acid in lieu of benzoylacrylic acid yields 4-(2-dimethylaminoethyl)-2-(β-hydroxy-p-methoxyphenethyl)-2H-1,4-benzothiazin-3-(4H)-one, hydrochloride.

Substitution of equivalent quantities of 2-morpholinoethyl chloride, 2-pyrrolidinoethylchloride, and 3-(4-benzylpiperazino)propyl chloride in place of the 2-dimethylaminoethyl chloride in Example 1(B) gives 4-(2-morpholinoethyl)-2-(β-hydroxyphenethyl)-2H-1,4-benzothiazin-3(4H)-one, hydrochloride, 4-(2-pyrrolidinoethyl)-2-(β-hydroxphenethyl)-2H-1,4-benzothiazin-3(4H)-one, hydrochloride, and 4-[3-(4-benzylpiperazino)-propyl]-2-(β-hydroxyphenyl)-2H-1,4-benzothiazin-3(4H)-one, dihydrochloride, respectively.

EXAMPLE 10

4-(2-dimethylaminoethyl)-2-phenethyl-2H-1,4-benzothiazin-3(4H)-one

A mixture of 7 g. of material from Example 1, 7 g. of red phosphorus and 40 ml. of hydroiodic acid is refluxed for 5 hours, cooled and basified with sodium hydroxide. The product is extracted with ether and dried over magnesium sulfate. Evaporation of the solution yields the above-named product.

EXAMPLE 11

4-(2-dimethylaminoethyl)-2-(β-hydroxphenethyl)-2H-1,4-benzothiazin-3-(4H)-one, 1-oxide To a solution of hydrogen peroxide is added 4-(2-dimethylaminoethyl - 2 - (β - hydroxyphenethyl)2H-1,4-benzothiazin-3(4H)-one and the product of this example is recovered.

EXAMPLE 12

4-(2-dimethylaminoethyl)-2-(β-hydroxphenethyl)-2H-1,4-benzothiazin-3-(4H)-one, 1,1-dioxide Repeating the procedure of Example 11 but utilizing potassium permanganate in lieu of hydrogen peroxide, the product recovered is 4 - (2-dimethylaminoethyl)-2-(β - hydroxyphenethyl)2H-1,4-benzothiazin-3-(4H)-one, 1,1-dioxide.

EXAMPLE 13

4-(2-dimethylaminoethyl)-2-(β-hydroxphenethyl)-2H-1,4-benzothiazin-3(4H)-one, methochloride A solution of 5.0 g. of the free base of the material from Example 1 in 50 ml. of acetonitrile is cooled and treated with 15 g. of methyl chloride. The solution is allowed to stand for a day at room temperature and the solvent removed under reduced pressure to 4-(2-dimethylominoethyl - 2 - (β-hydroxyphenethyl)-benzothiazin-3(4H)-one, methochloride.

The invention may be variously otherwise embodied within the scope of the appended claims.

What is claimed is:

1. A compound having the formula

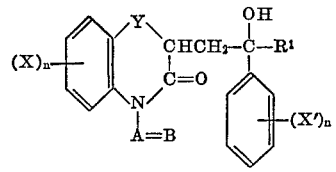

dehydration products and physiologically acceptable acid-addition salts and quaternary salts thereof, wherein Y is selected from the group consisting of thia (—S—), sulfone (—SO$_2$—) and sulfoxide (—SO—); and X and X' are selected from the group consisting of hydrogen, hydroxy, lower alkyl, lower alkoxy, phenyloxy, lower alkylthio, nitro, amino, halo and trifluoromethyl; R$^1$ is selected from the group consisting of hydrogen, lower alkyl, phenyl lower alkyl, thienyl, pyridyl, lower cycloalkyl of from 3 to 6 carbon and X-substituted phenyl; n is 0 to 5; A is lower alkylene; and B is a basic nitrogen-containing radical of less than twelve carbon atoms selected from the group consisting of amino; (lower alkyl)amino; di(lower alkyl)amino; (hydroxy - lower alkyl) amino; di(hydroxy - lower alkyl)amino; phenyl(lower alkyl)amino; N - (lower alkyl)phenyl (lower alkyl) amino; piperidino; (lower alkyl)piperidino; di(lower alkyl)piperidino; (lower alkoxy)piperidino; homopiperidino; 2,3- or 4-piperidyl; 2,3- or 4-(N-lower alkyl piperidyl); pyrrolidino; (lower alkyl)pyrrolidino; di(lower alkyl) pyrrolidino; (lower alkoxy)pyrrolidino; 2- or 3 - pyrroidyl; 2- or 3 - (N - lower alkylpyrrolidyl); morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazino; 4 - R$^1$-substituted piperazino; [hydroxy - (lower alkyl)]piperazino; (lower alkyl)piperazino; di(lower alkyl)piperazino; (lower alkoxy)piperazino; homopiperazino; and 4-R$^1$-substituted homopiperazino.

2. A compound in accordance with the formula of claim 1 having the name 4 - (2 - dimethylaminoethyl)-2 - (β - hydroxyphenethyl)-2H-1,4-benzothiazin-3(4H)-one, hydrochloride, dihydrate.

3. A compound in accordance with the formula of claim 1 having the name 4 - [3 - (4-methyl-1-piperazinyl) propyl] - 2 - (β-hydroxyphenyl)-2-3H-1,4-benzothiazin-3(4H)-one.

4. A dehydrated product of a compound in accordance with the formula of claim 1 having the name 4-[3-(4-methyl - 1 - piperazinzyl)propyl] - 2 - styryl-2H-1,4-benzothiazin-3(4H)-one, dihydrochloride.

5. A compound in accordance with the formula of claim 1 having the name of 4 - (2-dimethylaminoethyl)-2-phenethyl-2H-1,4-benzothiazin-3(4H)-one.

6. A compound having the formula

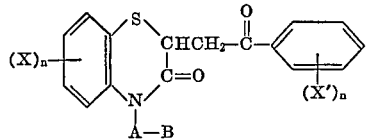

wherein X, X', n, A and B are as defined in claim 1.

7. A compound in accordance with the formula of claim 5 having the name 4-(2-dimethylaminoethyl)-2-phenacyl-2H-1,4-benzothiazin-3(4H)-one.

8. A compound in accordance with the formula of claim 5 having the name 4 - [3-(4-methyl-1-piperazinyl) propyl] - 2 - phenacyl-2H-1,4-benzothiazin-3-(4H)-one.

References Cited

UNITED STATES PATENTS 2,894,946  7/1959  Kirchner ........... 260—243

FOREIGN PATENTS 1,284,735  1/1962  France.

OTHER REFERENCES

Kirchner et al., J. Am. Chem. Soc., vol. 81, pp. 1721 to 1726 (1959).

JOHN D. RANDOLPH, Primary Examiner

U.S. Cl. X.R.
260—243, 999

UNITED STATES PATENT OFFICE
CERTIFICATE OF CORRECTION

Patent No. 3,471,481                      Dated October 7, 1969

Inventor(s) John Krapcho

It is certified that error appears in the above-identified patent and that said Letters Patent are hereby corrected as shown below:

Column 5, line 63, "hydroxyphenyl)" should read -- hydroxyphenethyl) --. Column 6, line 27, "ylominoethyl" should read -- ylaminoethyl --; line 50, "carbon" should read -- carbons --; line 61, "pyrroi" should read -- pyrroli --. Column 7, line 2, "(β-hydroxyphenyl)2-3H" should read -- (β-hydroxyphenethyl)-2H --; line 6, "piperazinzyl)" should read -- piperazinyl) --.

Signed and sealed this 11th day of August 1970.

(SEAL)
Attest:

EDWARD M. FLETCHER, JR.            WILLIAM E. SCHUYLER, JR.
Attesting Officer                  Commissioner of Patents